United States Patent
Kojima

(10) Patent No.: US 9,099,941 B2
(45) Date of Patent: Aug. 4, 2015

(54) VIBRATION TYPE DRIVING DEVICE

(75) Inventor: Nobuyuki Kojima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 13/809,574

(22) PCT Filed: Jul. 4, 2011

(86) PCT No.: PCT/JP2011/003810
§ 371 (c)(1),
(2), (4) Date: Jan. 10, 2013

(87) PCT Pub. No.: WO2012/008114
PCT Pub. Date: Jan. 19, 2012

(65) Prior Publication Data
US 2013/0113339 A1    May 9, 2013

(30) Foreign Application Priority Data

Jul. 15, 2010    (JP) .................. 2010-160592

(51) Int. Cl.
*H02N 2/00* (2006.01)
*H01L 41/09* (2006.01)
*H02N 2/10* (2006.01)
*F16H 33/20* (2006.01)

(52) U.S. Cl.
CPC .............. *H02N 2/103* (2013.01); *F16H 33/20* (2013.01); *H02N 2/006* (2013.01); *H02N 2/0015* (2013.01); *H02N 2/0055* (2013.01)

(58) Field of Classification Search
USPC .......... 310/311, 323.01–323.19, 323.21, 328
See application file for complete search history.

(56) References Cited

U.S. PATENT DOCUMENTS

| | | | |
|---|---|---|---|
| 5,416,375 A * | 5/1995 | Funakubo et al. | 310/323.16 |
| 5,698,930 A | 12/1997 | Takagi | |
| 2004/0189150 A1 | 9/2004 | Yamamoto | |
| 2005/0242686 A1 | 11/2005 | Yamamoto | |
| 2006/0113868 A1 | 6/2006 | Sakatani | |
| 2007/0182281 A1 * | 8/2007 | Mori | 310/317 |
| 2010/0283656 A1 * | 11/2010 | Zavrel et al. | 342/14 |

FOREIGN PATENT DOCUMENTS

| | | |
|---|---|---|
| CN | 101310433 A | 11/2008 |
| JP | 61-18369 A | 1/1986 |
| JP | 2001-37265 A | 2/2001 |
| JP | 2002-315336 A | 10/2002 |
| JP | 2004-304887 A1 | 10/2004 |
| JP | 2006-311790 A | 11/2006 |

* cited by examiner

*Primary Examiner* — Thomas Dougherty
(74) *Attorney, Agent, or Firm* — Canon USA Inc. IP Division

(57) ABSTRACT

A vibration type driving device includes a vibrator configured to make an elliptic motion of a contact portion by combining vibrations in different vibration modes, and a driven body configured to be rotated relative to the vibrator by the elliptic motion while being in contact with the contact portion. A contact pressure of the contact portion with the driven body is lower on a radial inner side than on a radial outer side in a radial direction of the rotation.

9 Claims, 10 Drawing Sheets

MODE-A

MODE-B

VIBRATION TYPE DRIVING DEVICE

TECHNICAL FIELD

The present invention relates to a vibration type driving device. More particularly, the present invention relates to a vibration type driving device that causes relative rotation of a driven body by combining vibrations in different vibration modes.

BACKGROUND ART

There has been proposed a vibration type driving device for generating rotary driving with a vibrator that combines vibrations in different vibration modes (shapes). PTL 1 discloses that relative rotary movement is generated in a substantially disk-shaped driven body while a rectangular flat vibrator is pressed against a bottom surface of the driven body. FIG. 12 schematically illustrates principal components of a vibration type driving device of this type. A driven body 5 is held rotatably on a center axis thereof. While the driven body 5 is spaced from a vibrator 1 in FIG. 12, in actuality, the driven body 5 is in pressing contact with upper faces of projections 2-1 and 2-2 of the vibrator 1. The vibrator 1 generates driving force in the X-axis direction of FIG. 12, and is located to rotate the driven body 5 in the tangential direction.

CITATION LIST

Patent Literature

[PTL 1] U.S. Patent Application Publication No. 2005/242686 A1

SUMMARY OF INVENTION

Technical Problem

Problems to be solved by a vibration type driving device of the present invention will be described with reference to FIG. 13. Here, only necessary contents are described, and details will be described below.

The vibrator 1 includes two projections 2-1 and 2-2 serving as contact portions with the driven body 5. The projections 2-1 and 2-2 are arranged on an upper surface of the vibrator 1 in almost the center of the vibrator 1 in the Y-axis direction and symmetrically in the X-axis direction in FIG. 12. One of the projections, that is, the projection 2-1 will be described in detail below.

In FIG. 13, points P and Q indicate both ends of the projection 2-1 in the Y-axis direction. A point O, which is closer to the point P, indicates the center point of rotary movement relative to the driven body 5. The point P is on the inner peripheral side (radial inner side), and the point Q is on the outer peripheral side (radial outer side).

The vibrator 1 produces a substantially elliptic motion in the XZ-plane in the projection 2-1 by excitation of vibration. The movement direction in which the elliptic motion causes the relative rotation (driving direction in which the projection drives the driven body) is the X-axis direction. When the velocities of the points P and Q in the X-axis direction (hereinafter referred to as driving velocities) are designated as Vp and Vq, respectively, the relationship between Vp and Vq is expressed as follows.
[Math.1]

$$Vp = Vq \qquad (1)$$

The velocities of the relative rotation of the driven body at the points P and Q in the circumferential direction (hereinafter referred to as circumferential velocities) are designated as Up and Uq, respectively. Since the peripheral velocity is the product of the rotating velocity and the radius of rotation, the relationship between Up and Uq is expressed as follows.
[Math.2]

$$|Up| < |Uq| \qquad (2)$$

Since the transmission efficiency of the velocity is generally less than 100%, the rotating velocity of the driven body is lower than the driving velocity. That is, the relationship in magnitude between the driving velocity and the circumferential velocity is expressed as follows.
[Math.3]

$$|Vp| > |Up|, \; |Vq| > |Uq| \qquad (3)$$

Thus, the relationship is given by the following Expression (4).
[Math.4]

$$|Up|/|Vp| < |Uq|/|Vq| < 1 \qquad (4)$$

It is found from Expression (4) that the transmission efficiency of the driving velocity is lower and more relative slips occur between the vibrator and the driven body at the point P than at the point Q.

In addition, the angles theta p and theta q between the circumferential velocities and the X-axis have the following relationship.
[Math.5]

$$|\theta p| > |\theta q| \qquad (5)$$

(where θp=theta p, θq=theta q)

That is, at the point P, there is a larger deviation between the direction of the driving velocity and the direction of the circumferential velocity and more relative slips occur between the vibrator and the driven body, than at the point Q.

Accordingly, Expressions (4) and (5) show that more wear occurs at the point P than at the point Q. That is, the entire contact portions do not uniformly wear, and wear progresses faster on the radial inner side. In this nonuniform wear state, the life of the vibration type driving device becomes shorter than in a uniform wear state. Further, if the wear state is nonuniform, the contact state between the vibrator and the driven body worsens, and this may degrade performance of the vibration type driving device.

When one projection is provided at almost the center of the vibrator in the X- and Y-axis directions, wear on the radial inner side also progresses faster because driving is performed in the state expressed by Expression (4) above.

In view of the above problems, it is an object of the present invention to suppress faster progress of wear at a contact portion on the radial inner side than on the radial outer side.

A vibration type driving device according to an aspect of the present invention includes a vibrator configured to make an elliptic motion of a contact portion by combining vibrations in different vibration modes; and a driven body configured to be rotated relative to the vibrator by the elliptic motion while being in contact with the contact portion. A contact pressure of the contact portion with the driven body is lower on a radial inner side than on a radial outer side in a radial direction of the rotation.

Advantageous Effects of Invention

According to the aspect of the present invention, it is possible to suppress faster progress of wear at the contact portion

DESCRIPTION OF EMBODIMENTS

Embodiments of the present invention will be described in detail below with reference to the drawings. It is generally known that the wear amount of a contact portion in a vibration type driving device depends on the pressure at the contact portion (hereinafter referred to as a contact pressure). The wear amount with respect to the driving amount increases as the contact pressure increases. In the present invention, more increase in wear amount on a radial inner side than on a radial outer side can be offset by making the contact pressure lower on the radial inner side than on the radial outer side.

First Embodiment

Figure 1:
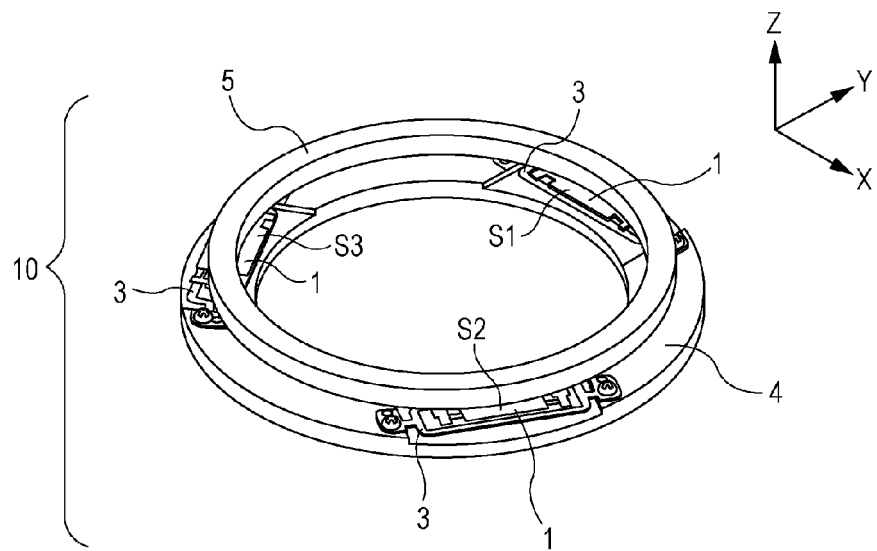
FIG. 1 is a perspective view of a vibration type driving device according to a first embodiment of the present invention.

FIG. 1 is a perspective view illustrating the structure of a principal part of a vibration type driving device 10 according to a first embodiment of the present invention. The vibration type driving device 10 illustrated in FIG. 1 includes three vibrator units S1, S2, and S3, a holding member 4 that holds the vibrator units S1, S2, and S3, and an annular driven body 5 held in pressing contact with the vibrator units S1, S2, and S3. The three vibrator units S1, S2, and S3 are arranged substantially concentrically with the center axis of the annular driven body 5 (synonymous with "an axis of relative rotation of the driven body) and at positions that substantially trisect the circumference. In the present invention, the number of vibrator units can be arbitrarily determined, and for example, may be one or a plural number of two or more. The number can be determined in accordance with the required characteristic.

Figure 2:
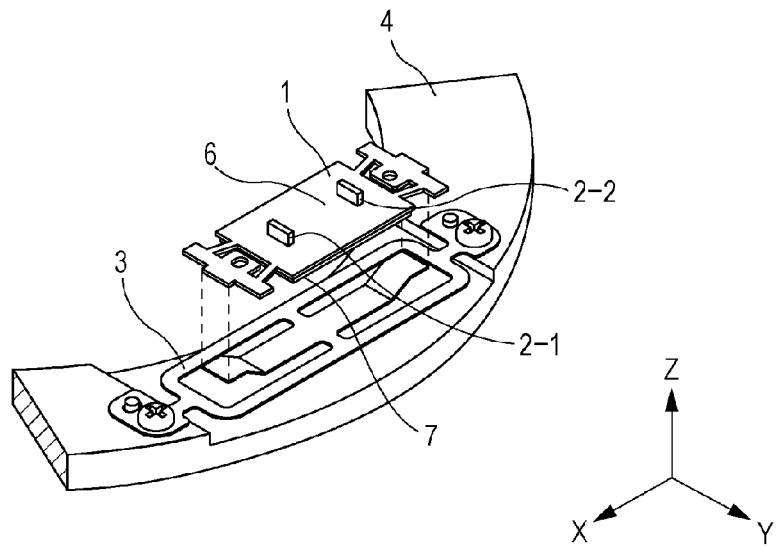
FIG. 2 is a partial perspective view of the vibration type driving device of the first embodiment.

As illustrated in FIGS. 1 and 2, each of the vibrator units S1, S2, and S3 is fixed to the holding member 4 in a manner such that upper faces (contact faces) of projections 2-1 and 2-2 serving as contact portions with the driven body 5 are parallel to the XY plane. The vibrator units S1, S2, and S3 have the same shape, and each include a vibrator 1 and a connecting member 3 that connects the vibrator 1 to the holding member 4. The vibrator 1 includes a vibration plate 6 formed by an elastic plate having two projections 2-1 and 2-2 serving as contact portions with the driven body 5, and a substantially rectangular electromechanical energy transducer 7 joined to the vibration plate 6. The vibration plate 6 is formed of a ferromagnetic material such as martensite stainless steel. The vibrator 1 is also provided with a flexible printed board (not illustrated) that electrically connects the electromechanical energy transducer 7 to the outside. As the electromechanical energy transducer 7, a piezoelectric element or an electrostrictive element can be used. The connecting member 3 is formed by a thin plate of phosphor bronze or the like, and has a characteristic of a leaf spring. The connecting member 3 elastically holds and fixes the vibrator 1.

Figure 3:
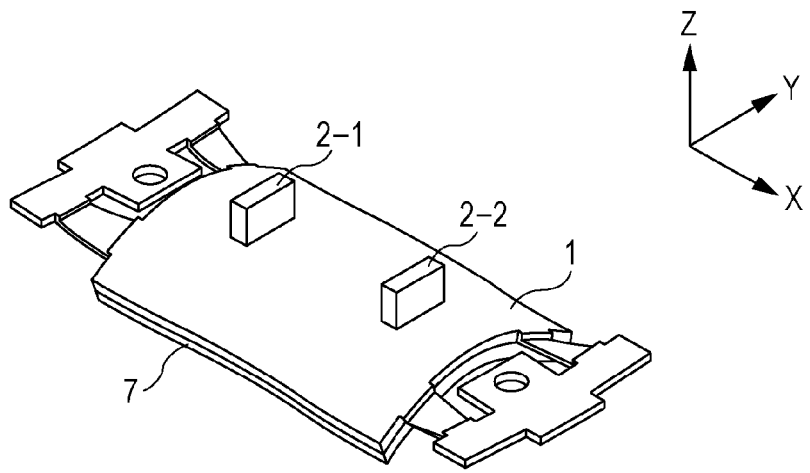
FIG. 3 illustrates perspective views illustrating vibration modes of a vibrator to which the first embodiment of the present invention is applicable.
Figure 3:
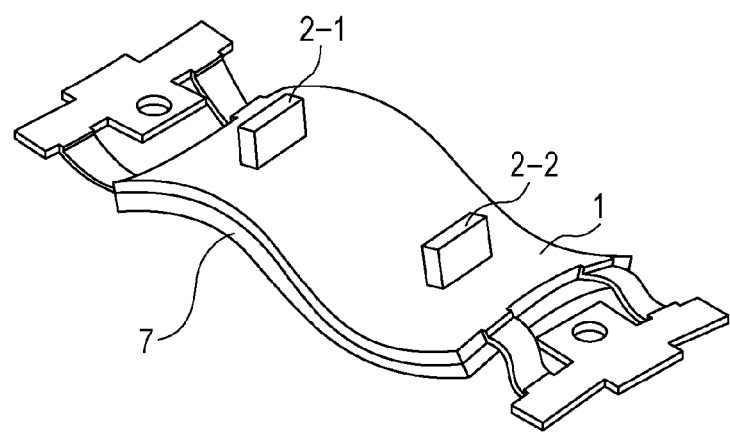

With reference to FIG. 3, a description will be given of two vibration modes excited in the vibrator 1 of the first embodiment. In the first embodiment, two out-of-plane bending vibration modes (MODE-A and MODE-B) are excited by applying an alternating-current voltage to the electromechanical energy transducer 7 in the vibrator 1. MODE-A is a primary out-of-plane bending vibration mode in which two nodes appear parallel to the X-axis direction of FIG. 3 serving as the longitudinal direction of the vibrator 1. By MODE-A vibration, the amplitude of displacement in a direction perpendicular to the faces of the projections 2-1 and 2-2 in contact with the driven body (Z-axis direction) is produced in the projections 2-1 and 2-2. MODE-B is a secondary out-of-plane bending vibration mode in which three nodes appear substantially parallel to the Y-axis direction of FIG. 3 in the vibrator 1. By MODE-B vibration, the amplitude of displacement in a direction parallel to the faces of the projections 2-1 and 2-2 in contact with the driven body (X-axis direction) is produced in the projections 2-1 and 2-2.

Figure 14A:
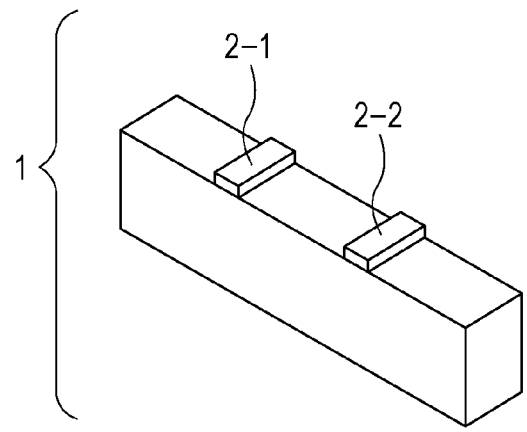
FIG. 14A schematically illustrates the shape of a vibrator to which the present invention is applicable.
Figure 14B:
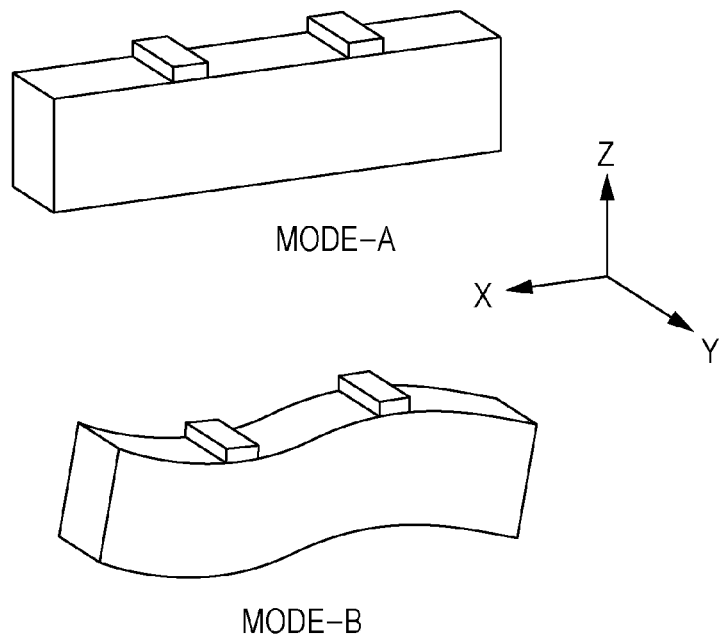
FIG. 14B schematically illustrates vibration modes of the vibrator to which the present invention is applicable.

By combining these two vibration modes, an elliptic motion is generated in a substantially XZ plane on the upper faces of the projections 2-1 and 2-2 serving as the contact portions, so that a force for driving the driven body in a direction substantially identical to the X-axis direction is produced. This driving force rotates the driven body 5 relative to the vibrator 1. However, the present invention is not limited to the above-described structure of the vibrator, and the vibrator may excite other out-of-plane bending vibration modes. As illustrated in FIGS. 14A and 14B, the vibrator may excite another vibration mode. A vibrator 1 illustrated in FIG. 14A is shaped like a substantially rectangular parallelepiped. In the vibrator 1, a primary longitudinal vibration mode (MODE-A) in which the vibrator 1 stretches in the X-axis direction) and a secondary out-of-plane bending vibration mode (MODE-B) in which three nodes appear substantially parallel to the X-axis direction are excited, as illustrated in FIG. 14B. By combining these two different vibration modes, an elliptic vibration in the substantially XZ plane is generated on the upper faces of projections 2-1 and 2-2. By operating the vibrator 1 in this way, the present invention can be applied to the vibrator 1, similarly to the vibrator of FIG. 3.

Referring again to FIG. 1, a description will be given of the structure of the vibration type driving device 10 of the first embodiment. The driven body 5 is formed of a rare-earth magnet material as an annular permanent magnet, and is magnetized in the Z-axis direction. The magnetic force of the driven body 5 attracts the vibrator 1 so as to generate a contact pressure between the driven body 5 and the vibrator 1. In the first embodiment, a permanent magnet can be provided in the vibrator and the driven body can be formed of a ferromagnetic material. That is, it is only necessary that one of the vibrator and the driven body includes a permanent magnet and the other includes a ferromagnetic material. Further, each of the vibrator and the driven body can include a permanent magnet.

A bottom surface of the driven body 5 on the lower side of FIG. 1 is plated with Ni or the like to be resistant to wear, and is also made flat parallel to the XY plane to form a sliding surface. This sliding surface contacts the vibrators 1. Since the vibrators 1 are elastically held by the connecting members 3, the sliding surface of the driven body 5 constantly follows the upper faces of the projections 2-1 and 2-2. The contact portions are thus constantly in stable contact with the sliding surface, whereby the driving force of the vibrators 1 is stably transmitted to the driven body 5. In order for the driven body 5 to rotate on the center axis of the ring, rotations on other axes and linear motion of the driven body 5 are regulated by a guide member (not illustrated).

Figure 4:
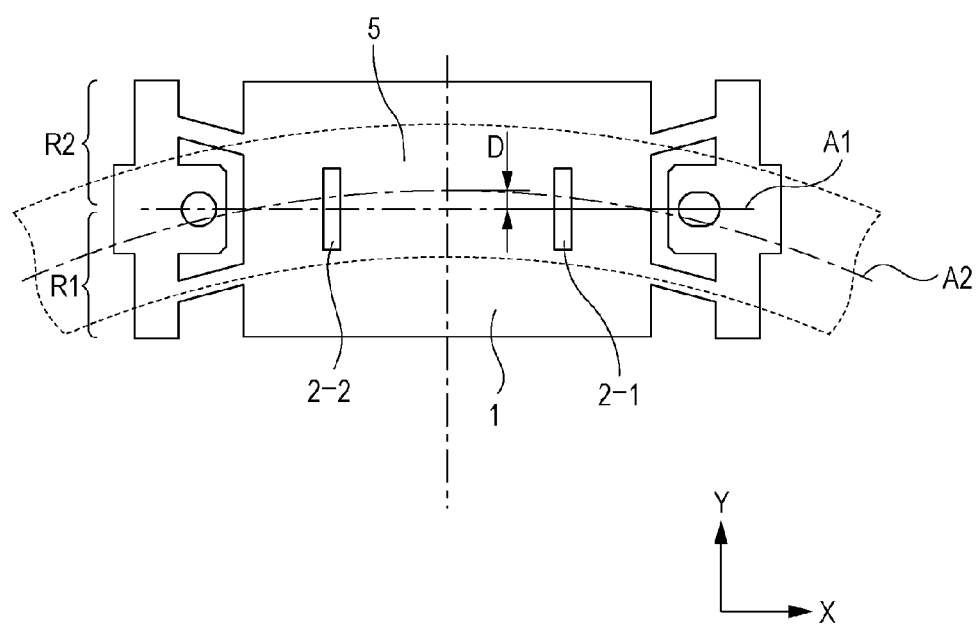
FIG. 4 is a top view of the vibration type driving device of the first embodiment.

Magnetic attracting force produced between each vibrator 1 and the driven body 5 will be described with reference to FIGS. 4 and 5. FIG. 4 is a top view illustrating the positional relationship between the vibrator 1 and the driven body 5. The vibrator 1 is substantially symmetrical in the Y-axis direction (direction perpendicular to the driving direction of the contact portions). In FIG. 4, A1 represents the symmetry axis. R1 represents a region on a minus side of the symmetry axis A1 of the vibrator 1 in the Y-axis direction, and R2 represents a region on a plus side. The difference in attracting force between the region R1 and the region R2 is designated as DELTA_F. DELTA_F is a positive value when the attracting force is greater in the region R1 than in the region R2.

A2 represents the radial center line of the driven body 5, and D represents a position of the symmetry axis A1 relative to the center line A2 in the Y-axis direction. The relative position D is a negative value when the vibrator 1 is placed on the minus side in the Y-axis direction. For example, when the vibrator 1 is moved to the minus side in the Y-axis direction, that is, the relative position D is placed on the minus side, the projection position of the driven body 5 on the vibrator 1 is on the plus side in the Y-axis direction. Since the position of the driven body 5 serving as a source of magnetic force is on the radial outer side, the attracting force becomes smaller on the radial inner side than on the radial outer side. By changing the relative position in the Y-axis direction between the vibrator 1 and the driven body 5, the difference in attracting force between the radial inner and outer sides can be adjusted.

Figure 5:
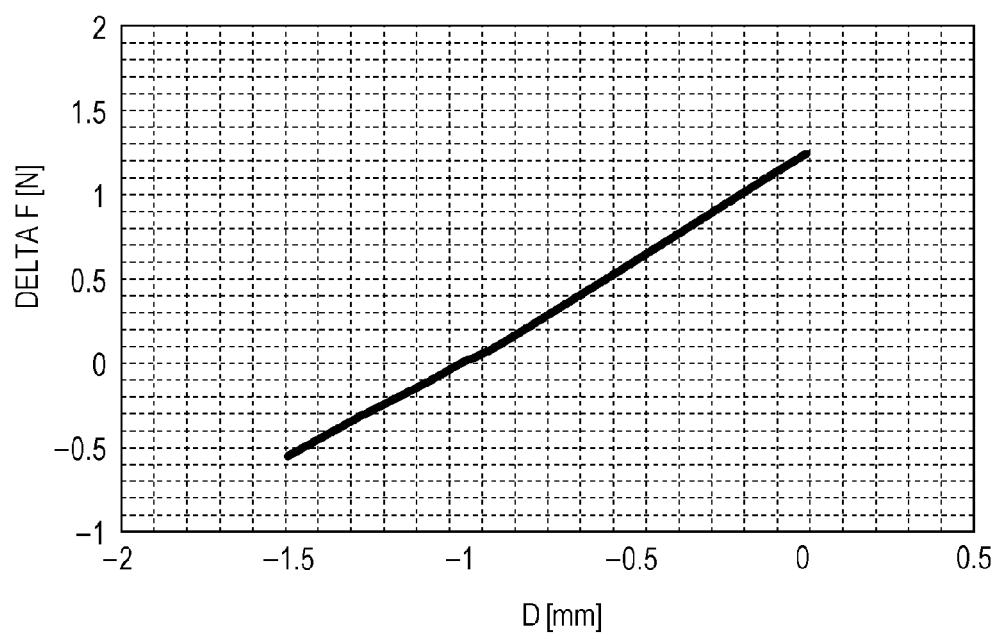
FIG. 5 is a graph showing the characteristic of the vibration type driving device of the first embodiment.

FIG. 5 is a graph showing the relationship between the relative position D and the difference DELTA_F in attracting force. Here, values calculated by computer simulation are shown. It can be confirmed from FIG. 5 that the difference DELTA_F in attracting force changes according to the relative position D. In the present invention, the contact pressure on the radial inner side is set to be lower than the contact pressure on the radial outer side. That is, when a value less than −1.0 mm is selected as the relative position D in FIG. 5, the attracting force is smaller on the radial inner side than on the radial outer side. Hence, the contact pressure is also lower on the radial inner side than on the radial outer side.

By determining the radial positions of the vibrator and the driven body so that the magnetic attracting force is smaller on the radial inner side than on the radial outer side, as described above, a difference in contact pressure is formed between the radial inner and outer sides so as to control the difference in wear amount between the radial inner and outer sides. Further, the wear amount can be made uniform by suppressing the increase in wear amount on the radial inner side due to rotary driving.

Figure 6:
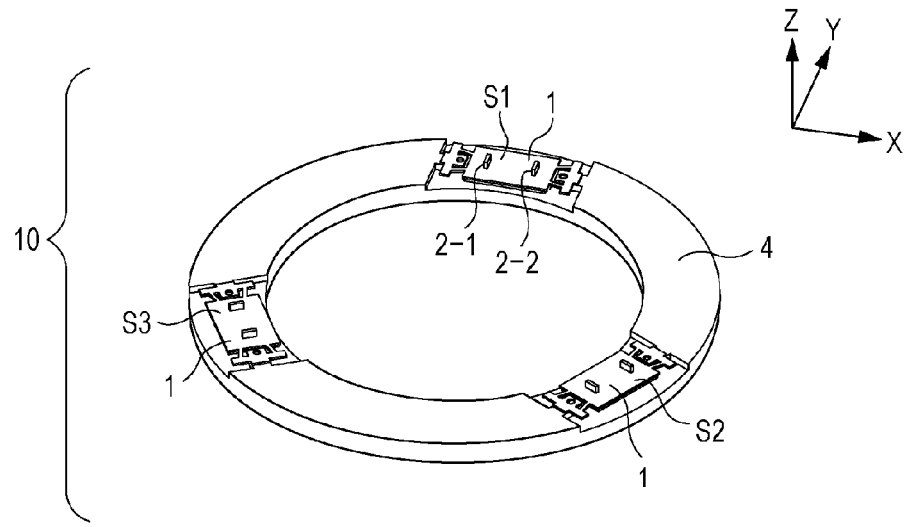
FIG. 6 is a perspective view of a vibration type driving device according to a modification of the first embodiment.

The first embodiment is also applicable to a vibration type driving device having a structure illustrated in FIG. 6 (modification). In FIG. 6, a driven body 5 is not illustrated. Three vibrators 1 are arranged substantially concentrically with the center axis, and are fixed to a holding member 4 at positions that substantially trisect the circumference. Upper faces of projections 2-1 and 2-2 of each vibrator 1 are adjusted to substantially coincide with the XY plane. This adjustment can be made, for example, by adjusting the height when bonding the vibrator 1 and the holding member 4 or polishing the upper faces of the projections 2-1 and 2-2 with a surface plate after bonding.

Compared with the structure illustrated in FIGS. 1 and 2, in this modification, a connecting member 3 is not provided, and portions of the vibrators 1 fixed to the holding member 4 have high elasticity. Hence the posture change of the vibrators 1 due to the force is small. However, even a small posture change may worsen the contact state and reduce the output of the vibration type driving device. That is, when the wear amount becomes larger on the radial inner side than on the radial outer side, performance of the vibration type driving device degrades. Hence, in this structure, performance of the vibration type driving device can also be stabilized by uniformizing the wear amount through the adjustment of the contact pressure that has been described with reference to FIGS. 4 and 5.

Second Embodiment

Figure 7:
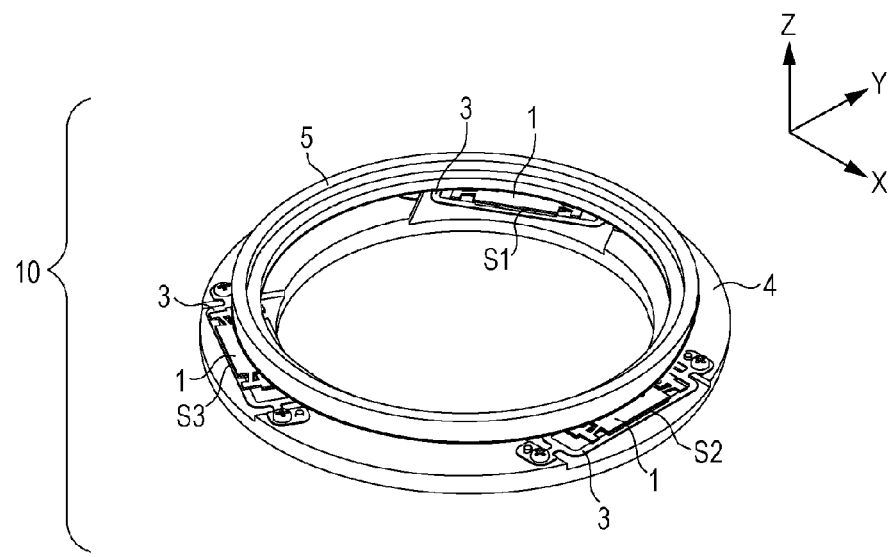
FIG. 7 is a perspective view of a vibration type driving device according to a second embodiment of the present invention.
Figure 8:
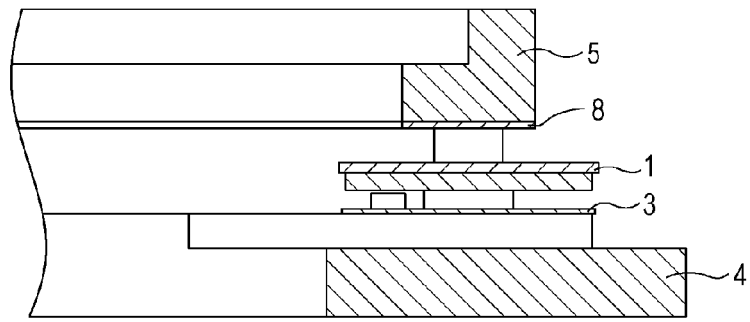
FIG. 8 is a partial cross-sectional view of the vibration type driving device of the second embodiment.

In a second embodiment, unlike the first embodiment, magnetic attracting force is made smaller on the radial inner side than on the radial outer side by forming a difference in magnetic flux density of the permanent magnet between the radial inner and outer sides. FIG. 7 is a perspective view illustrating the structure of the principal part of a vibration type driving device 10 according to the second embodiment of the present invention. FIG. 8 is a cross-sectional view of the vibration type driving device 10 of FIG. 7, taken along a plane including a vibrator unit S1.

Vibrator units S1, S2, and S3 and a holding member 4 have the same structures as those illustrated in FIG. 1 and so on, so descriptions thereof are skipped. A driven body 5 is formed of a rare-earth magnet material in a substantially annular shape, and is magnetized in the Z-axis direction. A ring-shaped friction member 8 is integrally bonded to a surface of the driven body 5 facing vibrators 1. The thickness of the driven body 5 is smaller in the Z-axis direction (rotation axis direction) on the radial inner side than on the radial outer side so that the magnetic flux density is lower on the radial inner side than on the radial outer side. By thus structuring the driven body 5, the magnetic attracting force produced between the driven body 5 and the vibrators 1 is made smaller on the radial inner side than on the radial outer side. Hence, similarly to the first embodiment, the contact pressure can be made lower on the radial inner side than on the radial outer side.

In the second embodiment, similarly to the first embodiment, a permanent magnet can be provided in the vibrator and the driven body can be formed of a ferromagnetic material.

That is, it only necessary that that one of the vibrator and the driven body includes a permanent magnet and the other includes a ferromagnetic material. Further, each of the vibrator and the driven body can include a permanent magnet. The present invention can be applied to this structure by forming a difference in thickness of the permanent magnet between the radial inner and outer sides so that the magnetic flux density is lower on the radial inner side than on the radial outer side.

Third Embodiment

Unlike the first and second embodiments, in a third embodiment, a pressing member is provided to press vibrators toward a driven body. A contact pressure is given by restoring force generated by elastic deformation of the pressing member.

Figure 9:
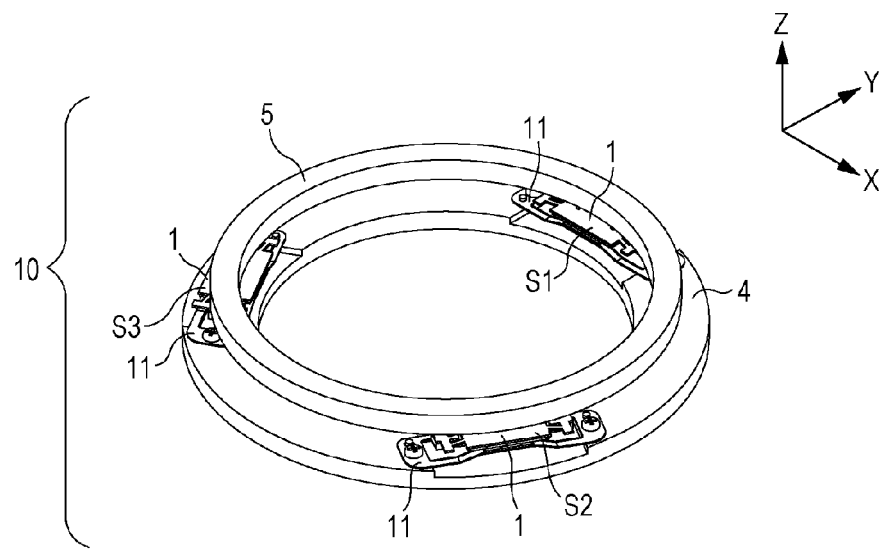
FIG. 9 is a perspective view of a vibration type driving device according to a third embodiment of the present invention.

FIG. 9 is a perspective view illustrating the structure of the principal part of a vibration type driving device 10 according to the third embodiment of the present invention. Descriptions of the same structures as those described with reference to FIG. 1 and so on are skipped, and only different structures will be described below. A driven body 5 is formed of martensite stainless steel in a substantially annular shape, and a surface thereof is azotized to increase wear resistance.

Figure 10A:
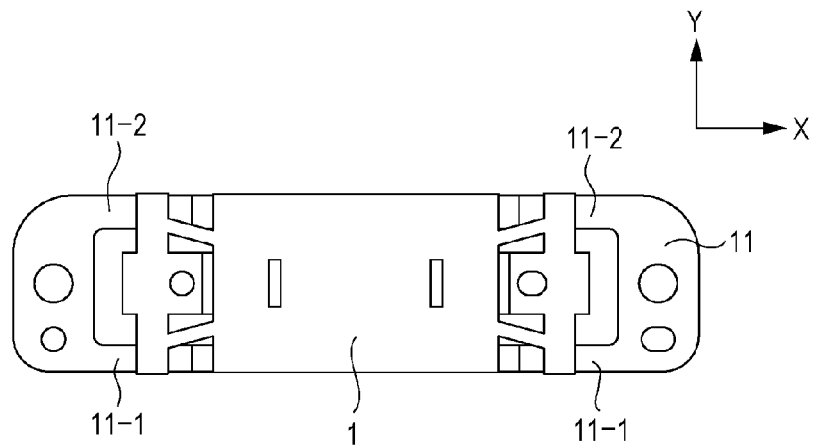
FIG. 10A is a plan view of a vibrator unit in the third embodiment.
Figure 10B:
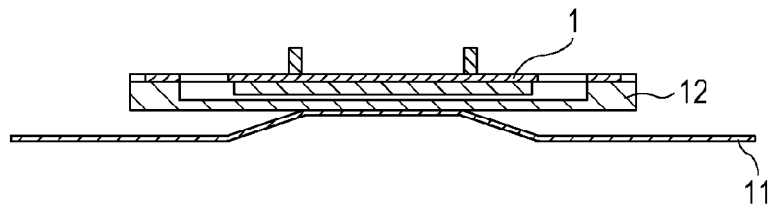
FIG. 10B is a cross-sectional view of the vibrator unit in the third embodiment.

FIG. 10A is a plan view of one vibrator unit. The plus side in the Y-axis direction is the radial outer side, and the minus side is the radial inner side. FIG. 10B is a cross-sectional view of the vibrator unit. A vibrator 1 that forms the vibrator unit is the same as that adopted in the first embodiment. The vibrator 1 is combined with a pressing member 11 with a metallic spacer component 12 being disposed therebetween. The pressing member 11 serves to hold the vibrator 1 and to generate a contact pressure between the vibrator 1 and the driven body 5. The pressing member 11 is formed by a thin plate of a material suitable for a spring component, for example, phosphor bronze. The pressing member 11 includes a contact portion in contact with the spacer component 12, two first deforming portions 11-1, and two second deforming portions 11-2. The width of the first deforming portions 11-1 is smaller than that of the second deforming portions 11-2. Hence, the rigidity of the first deforming portions 11-1 is lower than that of the second deforming portions 11-2.

In a state in which the vibrator unit is mounted in the vibration type driving device 10, each vibrator 1 is held while being pushed in the −Z-axis direction via the driven body 5 by a desired amount. That is, the first and second deforming portions 11-1 and 11-2 are held while bending in the Z-axis direction, and the restoring forces thereof generate a contact pressure between the vibrator 1 and the driven body 5. Since the rigidity of the first deforming portions 11-1 is lower than that of the second deforming portions 11-2, as described above, the contact pressure is lower on the radial inner side than on the radial outer side.

Figure 11:
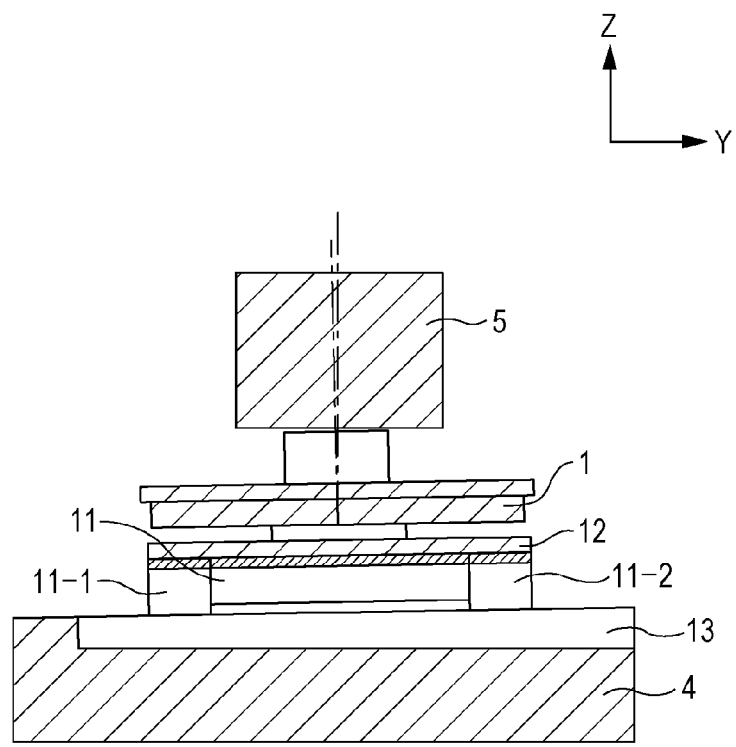
FIG. 11 is a partial cross-sectional view of a vibration type driving device according to a modification of the third embodiment.
Figure 12:
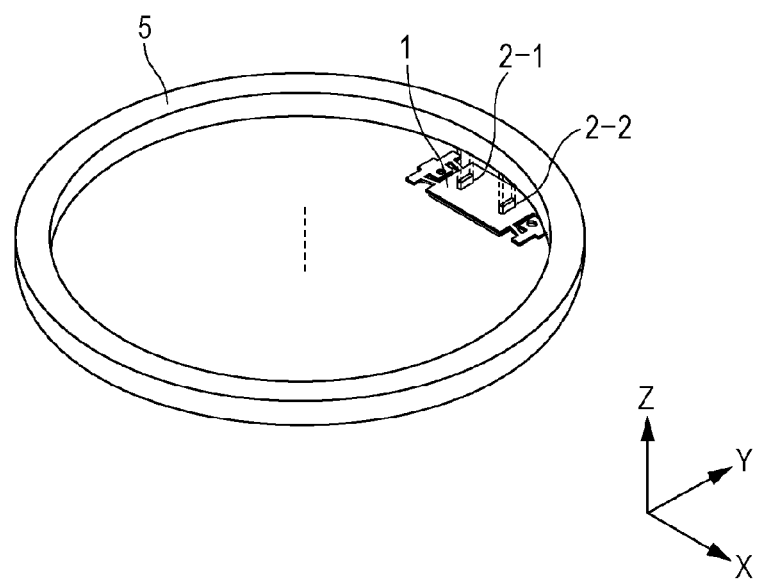
FIG. 12 is a perspective view of a vibration type driving device of the background art of the present invention.
Figure 13:
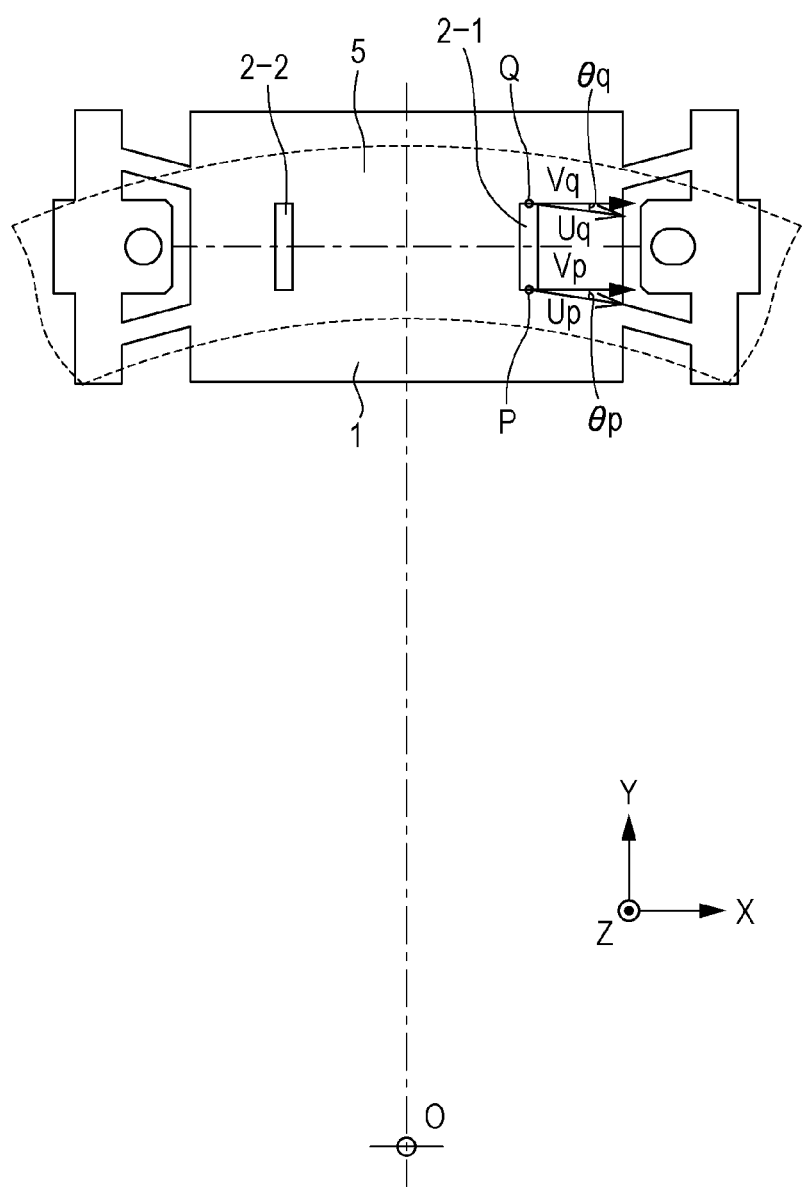
FIG. 13 schematically illustrates problems to be solved by the present invention.

FIG. 11 illustrates the structure of a modification of the third embodiment. In this modification, first deforming portions 11-1 and second deforming portions 11-2 in a pressing member 11 are substantially equal in width and rigidity. However, in the modification, a pressing-member mounting portion 13 of a holding member 4 is inclined such as to be higher on the radial outer side in the Z-axis direction (rotation axis direction). Thus, vibrator units mounted on the pressing-member mounting portion 13 are also higher on the radial outer side. That is, projections of vibrators 1 are higher on the radial outer side than on the radial inner side. When the vibrators 1 are pushed in the −Z-axis direction via a driven body 5 in this state, the first deforming portions 11-1 and the second deforming portions 11-2 bend, and generate restoring forces. Since a sliding surface of the driven body 5 follows contact portions of the vibrators 1, the bending amount and restoring force of the second deforming portions 11-2 are larger than those of the first deforming portions 11-1. As a result, the contact pressures at the contact portions are also lower on the radial inner side than on the radial outer side. While the height of the holding member 4 in the Z-axis direction is different between the radial inner and outer sides in the modification, the restoring force of the second deforming portions 11-2 can be made larger than that of the first deforming portions 11-1 by forming a difference in height of other members, such as the vibrators, between the radial inner and outer sides.

As described above, in the third embodiment, the contact pressure can be made lower on the radial inner side than on the radial outer side by making the restoring force due to elastic deformation of the pressing member smaller on the radial inner side than on the radial outer side. This can eliminate the difference in wear amount between the radial inner and outer sides.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-160592, filed Jul. 15, 2010, which is hereby incorporated by reference herein in its entirety.

The invention claimed is:

1. A vibration type driving device comprising:
   a vibrator configured to make an elliptic motion of a contact portion by combining vibrations in different vibration modes; and
   a driven body configured to be rotated relative to the vibrator by the elliptic motion while being in contact with the contact portion,
   wherein a contact pressure of the contact portion with the driven body is lower on a radial inner side than on a radial outer side in a radial direction of the rotation.

2. The vibration type driving device according to claim 1, wherein one of the vibrator and the driven body includes a permanent magnet and the other includes a ferromagnetic material, wherein the contact pressure is generated by an attracting force produced between the permanent magnet and the ferromagnetic material, and wherein the attracting force is smaller on the radial inner side than on the radial outer side so that the contact pressure of the contact portion with the driven body is lower on the radial inner side than on the radial outer side.

3. The vibration type driving device according to claim 2, wherein positions of the vibrator and the driven body in the radial direction are determined so that the attracting force is smaller on the radial inner side than on the radial outer side.

4. The vibration type driving device according to claim 2, wherein the driven body includes the permanent magnet, and wherein a thickness of the driven body in an axial direction of the rotation is smaller on the radial inner side than on the radial outer side so that the attracting force is smaller on the radial inner side than on the radial outer side.

5. The vibration type driving device according to claim 1, further comprising:
   a pressing member configured to press the vibrator toward the driven body,
   wherein the contact pressure is generated by a restoring force produced by elastic deformation of the pressing member, and wherein the restoring force is smaller on the radial inner side than on the radial outer side so that the contact pressure of the contact portion with the driven body is lower on the radial inner side than on the radial outer side.

6. The vibration type driving device according to claim 5, wherein the pressing member includes an elastically deformable first deforming portion located on the radial inner side and an elastically deformable second deforming portion located on the radial outer side, and wherein a rigidity of the first deforming portion is lower than a rigidity of the second deforming portion.

7. The vibration type driving device according to claim 6, wherein the first deforming portion is narrower than the second deforming portion.

8. The vibration type driving device according to claim 5, further comprising a holding member configured to hold the vibrator, wherein a height of the vibrator or the holding member in the axial direction of the rotation is smaller on the radial inner side than on the radial outer side so that the restoring force is smaller on the radial inner side than on the radial outer side.

9. The vibration type driving device according to claim 1, wherein a plurality of the vibrators relatively rotate the driven body.

* * * * *